Dec. 28, 1954 F. P. WILCOX ET AL 2,697,846
ROTOR ATTACHMENT FOR MATERIALS HANDLING MACHINES
Filed April 15, 1952 3 Sheets-Sheet 3
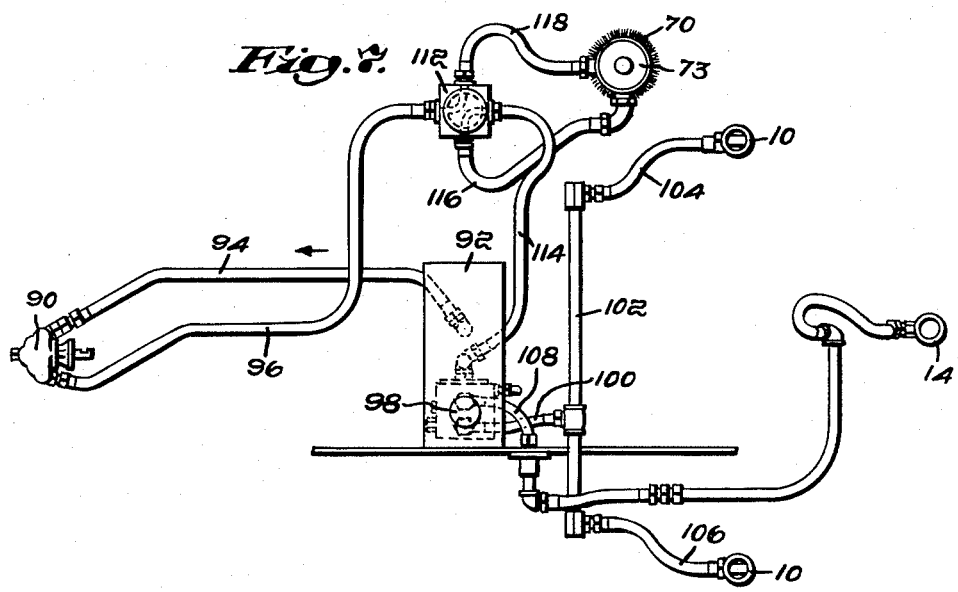
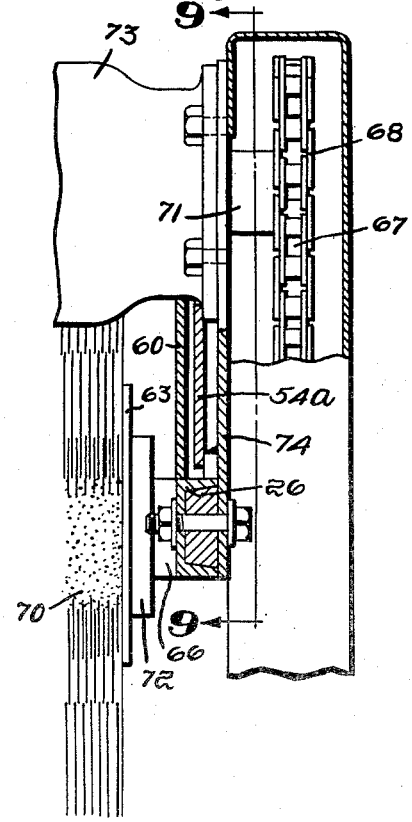
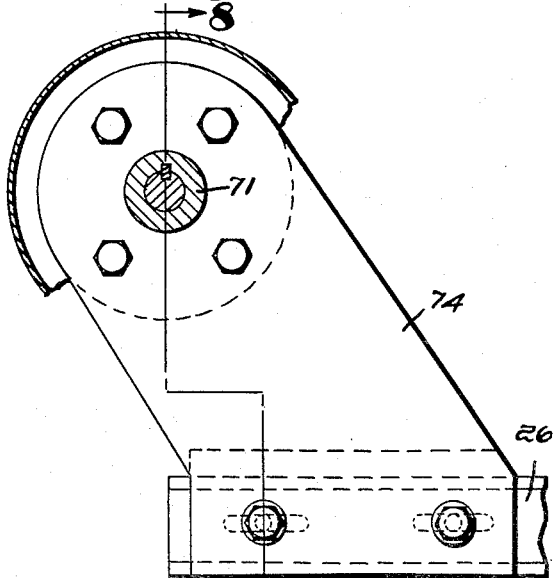
Inventors:
Francis P. Wilcox
Harvey A. Fitts
Hazen D. Boyce
Vernon V. Hamilton
by Attorney

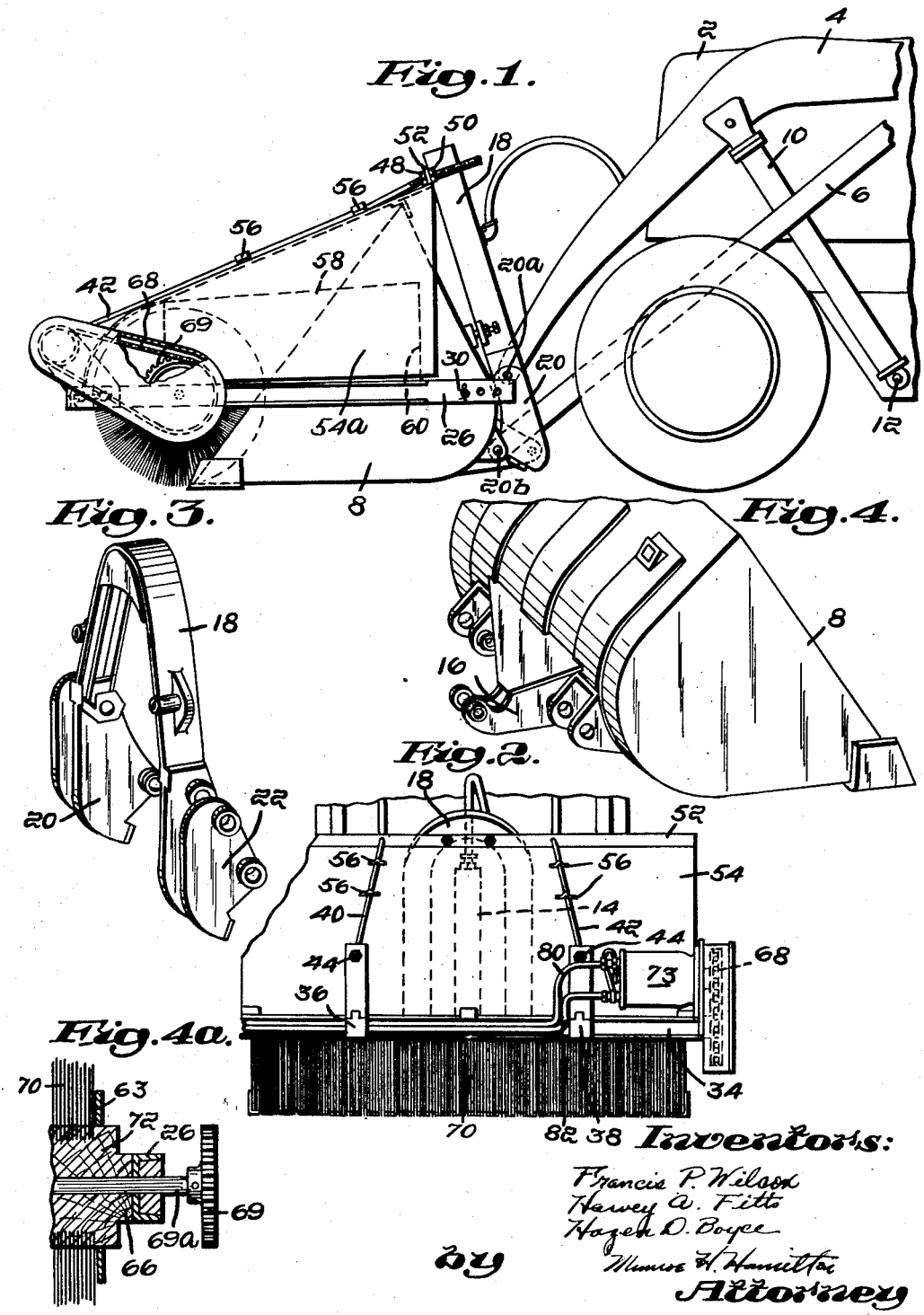

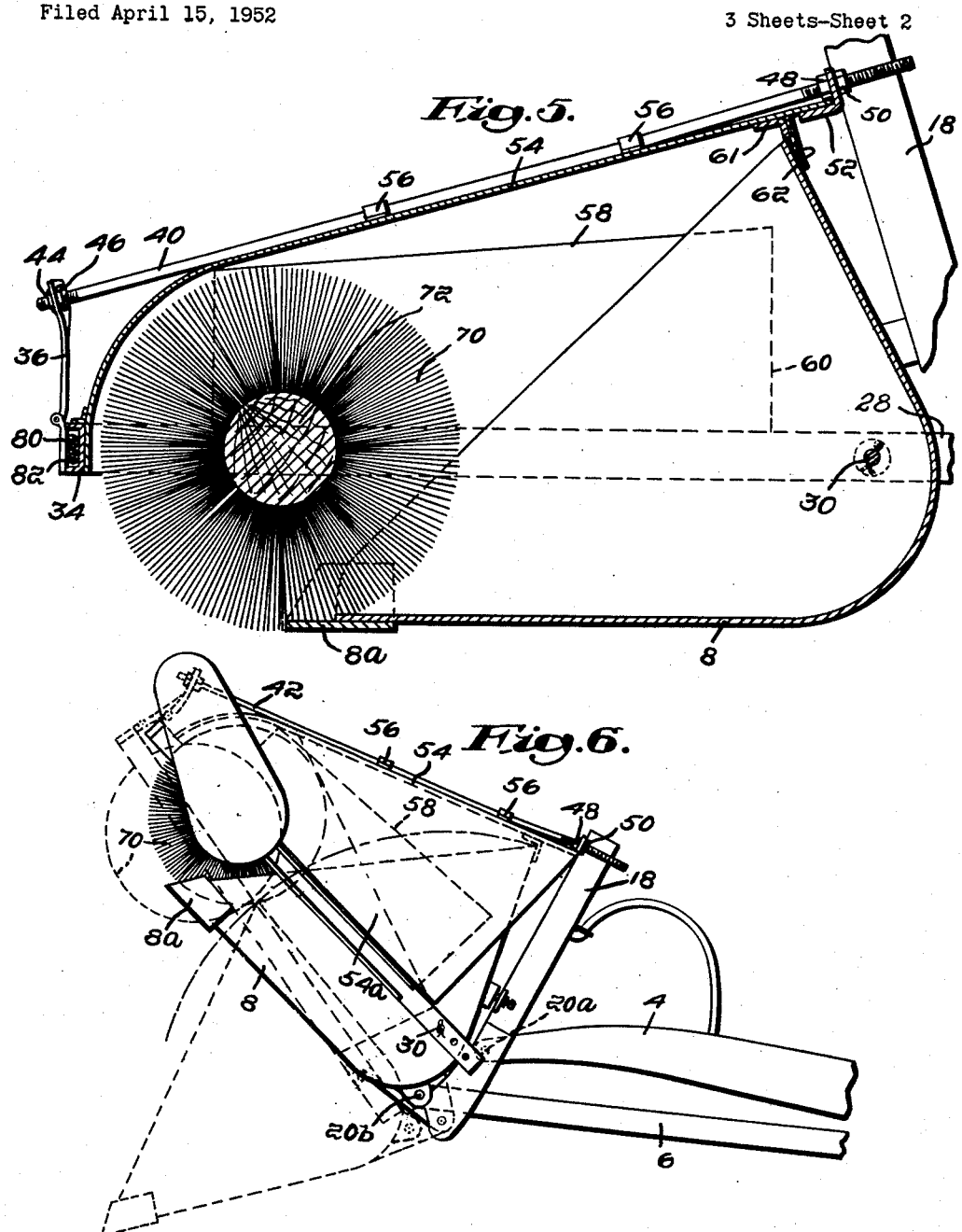

United States Patent Office 2,697,846
Patented Dec. 28, 1954

2,697,846

ROTOR ATTACHMENT FOR MATERIALS HANDLING MACHINES

Francis P. Wilcox, Needham, Harvey A. Fitts, Framingham, and Hazen D. Boyce, Natick, Mass.

Application April 15, 1952, Serial No. 282,346

3 Claims. (Cl. 15—83)

This invention relates to an improvement in materials handling machines of the type which includes a bucket or shovel supported at the front end thereof on hydraulically operated boom arms, or similar mechanism. Machines of this class include devices such as front end loaders, pay loaders, scoopmobiles, tractor shovels, dozer-shovels, and the like. The invention in one preferred embodiment comprises an attachment which can conveniently be applied to either new machines or machines already in use. It may also be desired to manufacture the device of the invention as a standard part of any one of the machines indicated.

Various arrangements have long been in use involving the provision of a rotary member, such as a brush, at the front end of road cleaning machines, and the desirable features of such brushes are well recognized. However, attempts to utilize a brush or other rotor element at the front end of a machine, such as a tractor shovel, have not been successful owing to the difficulty that arises from the fact that the bucket is supported for independent rotation about two different horizontal axes of rotation. The mounting of a rotor element in correct position to perform a satisfactory brushing operation, in cooperative relationship with the bucket or shovel, tends to create a problem of interference with movement of the bucket into an inverted position in the course of unloading material which has been scooped up in the bucket.

The present invention deals with the problem indicated and aims to devise a rotor mechanism preferably in the form of a brush attachment which can be readily attached to a machine such as a tractor shovel without interference with the normal working of the bucket and the bucket handling mechanism. Another object of the invention is to provide a rotor attachment and control valve mechanism which can be driven by an independent motor forming a part of the device and so arranged as to be readily controlled from the driver's cab of the pay loader with desirable flexibility features. Still another object is to provide a rugged supporting structure for a rotor element, which structure can be quickly and conveniently attached to a pay loader and which is so arranged that it can be adjusted into varying positions to compensate for wear or to provide for varying the pressure with which the rotor element is held against a surface.

These and other objects and novel features will be more fully understood and appreciated from the following description of a preferred embodiment of the invention selected for purposes of illustration and shown in the accompanying drawings, in which:

Fig. 1 is a fragmentary side elevational view of the front portion of a tractor shovel and further illustrating the structure of the invention attached to the front portion thereof;

Fig. 2 is a fragmentary front elevational view of the apparatus shown in Fig. 1;

Fig. 3 is a perspective view of a yoke member conventionally employed to control movement of the bucket;

Fig. 4 is another perspective view of the conventional bucket mechanism and further showing pivot brackets to which the yoke of Fig. 3 is customarily applied;

Fig. 4a is a fragmentary detail cross-sectional view of the rotor and shaft assembly, showing the manner in which the shaft is mounted in the frame members;

Fig. 5 is a vertical, cross-sectional view taken centrally of the brush attachment and bucket and indicating the association of the yoke member shown in Fig. 3 with the structure of the invention;

Fig. 6 is a side elevational view of the bucket and rotor attachment further illustrating both the bucket and rotary brush pivoted about horizontal axes into a fully raised position;

Fig. 7 is a diagrammatic view illustrating an hydraulic control line and regulating valves employed in controlling the operation of the rotor element of the invention;

Fig. 8 is a cross-section taken on the line 8—8 of Fig. 9; and

Fig. 9 is a cross-section taken on the line 9—9 of Fig. 8.

In the structure shown in the drawings, numeral 2 denotes the front portion of a tractor shovel which is intended to be illustrative of various types of machines, as noted above, with which the invention may be employed. It is customary in these tractor shovels for the engine to be located in the rear portion of the vehicle and this rear portion has not been shown in the drawings as it forms no part of the present invention.

Numerals 4 and 6 denote the customary boom arms which are employed in tractor shovels to support a bucket member 8. The boom arms occur in pairs and are pivotally supported on two opposite sides of the tractor body at points not shown in the drawings. Hydraulic lifting mechanism or motors comprising cylinders 10 pivoted at 12 on the tractor body are connected to the boom arms 4 and when operated function to raise and lower the boom arms carrying the bucket 8 into any desired position. The hydraulic cylinders are usually driven by pumps located, for example, in the rear of the vehicle and directly geared to the motor shaft of the vehicle engine, there being regulating valves in the vehicle cab for controlling the lifting operation.

Still another part of the conventional equipment for controlling movement of the bucket is a third hydraulic mechanism or motor comprising a cylinder indicated in dotted lines in Fig. 2 and denoted by the numeral 14. This hydraulic cylinder has its lower end pivotally attached to a center bracket 16 of the bucket 8 and at its upper end the hydraulic cylinder 14 is supported in a yoke member 18, better shown in Fig. 3 of the drawings. The yoke member, it will be observed, is provided with a pair of pivot arms 20 and 22 which are connected with the bucket and the boom arms 4 and 6 in the usual manner so that the bucket may be pivoted about a horizontal axis into a fully upright position, such as is shown in Fig. 6, for example, or it may be swung about into a completely inverted position, such as has been indicated in dotted lines in Fig. 6.

It will also be observed that the bucket while in any position into which it may be swung through the action of the yoke and cylinder 14 may, in addition, be raised or lowered by means of the boom arms 4 and 6 which pivot about a second horizontal axis in the well known manner. In one common arrangement the forward extremities of the boom arms 4 are pivotally connected to the respective pivot arms 20 and 22 on the yoke 18 and at points 20a, as noted in Fig. 1. Similarly, the forward extremities of the boom arm 6 are pivotally connected at the points 20b, as shown in Fig. 1.

In accordance with the invention we have found that we may successfully mount a rotor element in front of the tractor shovel by pivotally securing a novel supporting frame at two opposite sides of the bucket itself. In securing the supporting frame to the bucket we find that we are able to avoid interference with the normal pivoting of the bucket by selecting points of attachment which are chosen with reference to the bucket in an upright position and which occur in front of, and above, the axis about which the bucket is pivoted by the yoke and hydraulic cylinder mechanism described above.

Having one end of the supporting frame thus pivotally secured to the bucket, we find that we may suspend the outer ends of the supporting frame in hinged relationship with suspension means which are fixed to the yoke. With this arrangement as the bucket is tipped into an inverted position the rotor element at one point moves out of the path of rotation of the bucket to thus provide for suitable clearance. The rotor, however, can always be maintained in a proper cooperating relationship with the front edge of the bucket when the latter member is in position to scoop up material.

To accomplish these ends suitable proportions may be chosen for the parts employed so that when the bucket is inverted the center of the rotor element moves through an arc which, at one point, is spaced away from the axis of rotation of the bucket a distance greater than the radial distance from the pivot point of the bucket to its upper edge.

Considering this structure as shown more in detail in Figs. 1 and 5, it will be observed that the supporting frame includes two side frame pieces 26 and 28 which are pivotally supported on pins, as 30, one of which is shown in Fig. 1. The pins are mounted through two opposite sides of the bucket 8 at the points indicated. It will be observed that these points of location of the pins 30 have been chosen with reference to the bucket in an upright position and so that they occur above and ahead of the axis of rotation of the bucket 8 about the pivot bracket 16 and about which axis the bucket is swung when the yoke and its contained hydraulic cylinder 14 operate.

The side frame pieces 26 and 28 are preferably comprised by channel iron members and are connected together at their forward extremities by a front frame piece 34, better shown in Figs. 2 and 5 of the drawings. Secured to the exposed side of the front frame piece 34 are two hinge members 36 and 38 which comprise bottom hinge sections and top hinge sections, the extremities of the top hinge sections being connected to suspension members 40 and 42, better shown in Fig. 2 of the drawings.

The suspension members preferably comprise rods formed with threaded lower ends which are secured through suitable openings in the upper hinge sections and may be adjustably tightened by means of adjustment nuts, as 44 and 46, as shown. The upper extremities of the supporting rods may be similarly threaded and adjustably secured by adjustment nuts 48 and 50 in suitable openings formed in a transversely extending angle member 52. The latter member is in turn solidly fastened to the yoke member 18, as is better shown in Fig. 5. It should also be noted that adjustment of the rods in the hinge sections may be carried out to vary the pressure which forces the tractor against a surface and likewise the wear of bristles can be compensated for by the same adjustment.

It is pointed out that with the frame being supported in hinged relationship to the yoke and suspension members, as described, rotation of the bucket will result in the frame moving outwardly a short distance and the hinge sections being opened. The two supporting rods 40 and 42 have attached thereto by means of fastening members 56, a protective casing 54 and the casing is designed to extend all the way across the area included between the side frame pieces 26 and 28, and to extend downwardly to provide side panel portions 54a, as may be observed in Fig. 1. The protective casing serves to contain dust and prevent material which is being swept into the bucket from producing an undesirable transfer of dust.

Cooperating with the protective casing 54 are two shields 58 and 60 which are solidly secured to the upper surfaces of the frame pieces 26 and 28, and which extend throughout a substantial part of the length of these members. These side shields are preferably arranged so that they may extend inside of the side panel portions 54a. It is also pointed out that since the shields 58 and 60 are fixed to their respective frame pieces 26 and 28, they may move relative to the side panels 54a.

Another dust trapping element provided in the invention consists of a strip of angle iron 61 which is attached at the under side of the protective casing 54, and which supports along the lower edge thereof a flexible sealing strip 62. The latter strip is chosen of a length such that it may overlap an adjacent edge of the bucket 8 when the latter member is in the operative position shown in Fig. 5.

Located between the frame pieces 26 and 28 is the rotor element 70 of the invention which preferably is constructed in the form of a brush or rotary drum consisting of bristles secured to a wooden core 72. It should be understood, however, that the rotor element may take various other forms, such as scraper blades, hammer bars, and other devices which are designed to rotate about a horizontal axis.

At the two extremities of the wooden core 72 are annular guard plates 63. The wooden core is also formed with reduced ends 66, better shown in Fig. 8. A gear 69 is fixed on a shaft 69a, as illustrated in Fig. 4a, which shaft is received through a bore formed in the wooden core 72 and mounted for rotation in the side frames 26 and 28, all as shown in Fig. 4a. The gear 69 is driven by a chain 68, in turn driven by a gear 67. A shaft 71 carries the gear 67 and is driven by an hydraulic motor 73 mounted on a bracket 74 which is bolted to the frame piece 26 and which slopes rearwardly in the manner shown in Figs. 1 and 9.

It is pointed out that a novel feature of the invention is the provision of the separate hydraulic motor 73 so arranged that it can drive the rotor element independently of movement of the bucket or the boom arms. The driver, therefore, is in full control of the device at all times through the aid of hydraulic fluid conduits 80 and 82 which lead from the motor 73 to which they are connected along the channel section of the front frame piece 34, as suggested in Figs. 2 and 5, and then rearwardly to the main hydraulic valve control unit in the driver's cab of the machine.

A further important aspect of the invention is the provision of a special valve control arrangement by means of which the rotation of the rotor element may be controlled to provide for revolving the rotor in either direction. This arrangement has been shown more in detail and somewhat diagrammatically in Fig. 7 of the drawings. At the left-hand side of Fig. 7 has been shown a gear type hydraulic hoist pump 90 of conventional construction and which is driven by the engine of the tractor shovel in the usual manner. The member 90 pumps oil from an oil reservoir 92 which is located centrally of the tractor shovel cab, and the oil is conducted through a return conduit 94. This oil is then delivered under pressure through a second pressure line or conduit 96.

In the conventional type of hydraulic control mechanism for a tractor shovel, for example, it is customary to employ a standard plunger type control valve which has been indicated diagrammatically in the drawings and denoted by the numeral 98. This valve, it will be seen, controls the flow of oil through a conduit 100, then to a conduit 102, and finally through branch conduits 104 and 106, which lead into the two boom hoist cylinders 10, already referred to and shown in Fig. 1. Similarly, the valve 98 also controls movement of oil through a conduit 108 which delivers oil to the bucket cylinder 14 earlier referred to and shown in the drawings in Fig. 2. It will be apparent that by means of the arrangement described operation of the boom hoist cylinders 10 may be carried out either separately or in conjunction with operation of the bucket control cylinder 14, and this independence of operation must be maintained at all times.

Having due regard for this consideration we have devised a novel auxiliary valve arrangement for cooperating with the hydraulic motor 73 and controlling this member so that the same pressure line is employed without interference with the normal operation of either the boom hoist cylinders 10 or the bucket cylinder 14. It is pointed out that in order to successfully achieve this objective, it is essential that the control valve for the rotor motor 73 be located in the pressure conduit 96 between the pump and the control valve 98.

As will be noted from an inspection of Fig. 7, we have accomplished this objective by introducing a three-way control valve 112 in the line comprised by the conduit 96 at points intermediate the valve 98 and the pump 90. Moreover, we have so arranged this valve with respect to the conduits which feed hydraulic fluid to the brush that we are enabled to conveniently reverse the direction of flow of fluid and thus change the direction in which the rotor or brush member is revolved. The valve 112 is of a standard three-way plunger type and includes a well known valve structure which in one position of adjustment permits hydraulic fluid to pass through the conduit 96, then through the valve 112, and directly out through a conduit 114 connecting with the valve 98. In this position of adjustment of the valve 112, therefore, the normal independent operation of the boom hoist cylinders and the bucket control cylinder can be realized.

In order to place the rotor element and hydraulic motor 73 in operation, the control valve 112 is moved into a second position in which fluid or oil passes from the conduit 96 into the valve and then out through the conduit section 116, then to the motor 73, producing for example counterclockwise rotation of the broom member 70, as viewed in Fig. 7. From the motor 73 the fluid is returned through a conduit 118 to the valve 112 and then conducted away from the valve through the conduit 114 in the manner already described. It will be observed that with the hydraulic motor 73 in operation and rotating in the particular direction indicated, control of both the bucket and the boom arms can be independently carried out without any change over the standard operation of these parts.

If it is desired to change the direction of rotation of the motor 73 and broom 70, the valve 112 is moved into its third position of adjustment, in which event hydraulic fluid moves through the conduit 96 into the valve, then out through the conduit 118 to drive the motor 73 and brush 70 in a clockwise direction, as viewed in Fig. 7. Oil from the hydraulic motor 73, still under pressure, travels through the conduit 116 into the valve and out through the conduit 114, as before.

It is pointed out that the above described flexibility and independence of movement which can be realized is made possible due to the provision of the hydraulic motor 73 independently mounted on the frame of the brush attachment in accordance with the invention.

When applying the device of the invention to carry out one preferred type of brushing operation, for example, the bucket 8 is moved into a position such as that shown in Fig. 1 with the bottom of the bucket lying in contact with, or slightly above, a surface to be cleaned. It has been found that to locate the brush element 70 in correct cooperating relationship with the bucket in the position described, it is preferable for the central axis of the brush to lie in a vertical plane which passes approximately through the front edge of the bucket or, more properly, through the front edge of a guard member 8*a*. The length of the frame pieces 26 and 28, therefore, has been chosen so that the brush may assume the relative position shown in Figs. 1 and 6.

In operation the device in the position shown in Fig. 1 may be operated so that the brush rotates in a counterclockwise direction and will therefore sweep material directly into the bucket 8. If desired the rotation may be reversed to sweep material away from the bucket. When a quantity of material has been brushed into the bucket the boom arms, through the cylinder 10, are raised to locate the bucket and brush assembly in the position shown in full lines in Fig. 6. At this point it is desired to dump the bucket without having the edge of the bucket strike against the brush member and it will be observed from the dotted line positions indicated in Fig. 6 that as the bucket is rotated about its axis of pivoting, the frame moves outwardly to locate the brush member in a projected position in which its outer periphery is spaced away from the path of travel of the top edge of the bucket and a suitable clearance is provided. It will readily be appreciated that this clearance can be provided for in any position into which the boom arms are swung and likewise the bucket may be inverted in any desired position without interference with the brush attachment.

While we have shown one preferred arrangement of the frame and rotor unit occurring in hinged relationship to the yoke it is intended that other hinge means may be resorted to and various other forms of supporting frames and suspension arms or rods may be employed.

From the foregoing description it will be evident that we have provided a novel and efficient attachment for tractor shovels and the like. A wide range of control can be exercised without in any way interfering with normal operation of the hydraulic system of such trucks and the movement of the bucket into and out of an inverted position automatically locates the brush out of the path of travel of the bucket edge. The construction described is convenient to manufacture and install and can be strongly built to withstand long periods of operation.

Having thus described our invention, what we claim as new is:

1. In combination with a materials handling tractor shovel of the class having a bucket, a pair of boom arms pivotally supported at one end and pivotally attached to said bucket at the other end, and hydraulic mechanism pivotally attached at one end to a support and pivotally attached at its other end to said bucket for swinging the bucket about its pivotal supporting means, an attachment comprising a pair of coextensive and parallel frame pieces pivotally attached to said bucket at one end and having a rotor element mounted on the other end, a hydraulic motor for operating said rotor element, the axis about which the frame pieces are supported being located offset upwardly from a plane drawn through the pivotal support of the bucket and the axis of said rotor element.

2. A structure as defined in claim 1 including a cross piece connecting the two outer ends of the frame pieces, a yoke member, hinging means connected to said cross piece, and adjustable rods connecting said hinging means with said yoke, whereby upon swinging of said yoke said frame pieces are swung about their pivotal connection to said bucket.

3. A structure as defined in claim 1, in which the said hydraulic mechanism includes a hydraulic support consisting of a yoke member extending upwardly from the rear side of the bucket, and adjustment rods located above the bucket and adjustably secured in the said yoke to selectively locate the rotor in a desired position of register with the said bucket.

References Cited in the file of this patent

UNITED STATES PATENTS

| Number | Name | Date |
|---|---|---|
| 793,700 | Whittemore | July 4, 1905 |
| 1,232,294 | Hagerty | July 3, 1917 |
| 1,238,385 | Bradshaw | Aug. 28, 1917 |
| 2,109,393 | Le Bleu | Feb. 22, 1938 |
| 2,501,243 | Snyder | Mar. 21, 1950 |
| 2,597,692 | Wills | May 20, 1952 |

OTHER REFERENCES

Hough Payloader Model HL, publication received in Div. 27 November 9, 1938 (p. 4, only of interest).